(12) United States Patent
Kuroki et al.

(10) Patent No.: US 6,236,325 B1
(45) Date of Patent: May 22, 2001

(54) POSITION DETECTOR WITH IRREGULARITY DETECTABLE FUNCTION AND CABLE FOR USE IN THE SAME

(75) Inventors: Shingo Kuroki; Yasuo Yamaguchi; Hiroaki Kawada, all of Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/466,874

(22) Filed: Dec. 20, 1999

(30) Foreign Application Priority Data

Dec. 25, 1998 (JP) .................................................. 10-371464

(51) Int. Cl.⁷ .................................................... G08B 21/00
(52) U.S. Cl. .............................. 340/635; 700/13; 700/186
(58) Field of Search ............................ 340/635; 700/186, 700/13

(56) References Cited

U.S. PATENT DOCUMENTS 4,118,690  10/1978  Paynton .
4,494,206 * 1/1985  Imazeki et al. ...................... 364/474
5,034,877 * 7/1991  Shultz ............................. 364/167.01
5,051,579  9/1991  Tsukiji et al. .
5,406,267  4/1995  Curtis .

* cited by examiner

*Primary Examiner*—Jeffery Hofsass
*Assistant Examiner*—Son Tang
(74) *Attorney, Agent, or Firm*—Oliff & Berridge PLC

(57) ABSTRACT

A position detector and cable for use in the same can be provided for reducing the space and cost as well as easing maintenance. A scale unit (1) generates an alarm signal (ALAM) for informing of an error when it occurs associated with generating position pulses (PA, PB and PZ). A signal cable (6) transfers the alarm signal (ALAM) to a connector (7). The connector (7) contains an alarm indicator (31) that lights on in response to the alarm signal (ALAM) output from the scale unit (1) when an irregularity occurs.

7 Claims, 3 Drawing Sheets

POSITION DETECTOR WITH IRREGULARITY DETECTABLE FUNCTION AND CABLE FOR USE IN THE SAME

BACKGROUND OF THE INVENTION

1. Field of the Invention

The present invention relates to a position detector that employs a scale unit having a linear encoder and so forth. The present invention relates more particularly to a position detector having a function capable of detecting irregularities, such as a failure in the encoder and a break in a cable, and cable for use in the detector.

2. Description of the Related Art

In a positioning device for a machine tool and semiconductor manufacturing equipment, output signals from a scale unit having a linear encoder can typically be employed as position feedback signals for a controller. The position signals from the linear encoder to the controller may often be transmitted in the form of differential signals with A/B/Z phases on the basis of RS422A. The conventional controller has the following functions for detecting irregularities of the outputs from the linear encoder;

(1) A function for detecting a break and poor connection in a cable between the output of the encoder and the input of the controller; and (2) A function for detecting an irregularity in the output value from the encoder.

With respect to (1), detecting a high-impedance state of the controller input can perform the irregularity detection. As for (2), detecting if a deviation between position instruction information and position feedback information from the scale unit (encoder) is an abnormal value can perform the irregularity detection. Some controllers may not have the function (2). In those cases, an irregularity detecting circuit is provided inside the scale unit for diagnostic checks on itself. The circuit varies its output to a high-impedance state when an irregularity occurs so that the controller can detect the irregularity of the encoder output.

The above irregularity detection method for the conventional position detector, however, has such a disadvantage that the controller can not determine whether the high-impedance state detected is caused from a break in the signal cable or an output irregularity of the encoder in the scale unit. This makes it difficult to perform a fast procedure at the time of maintenance.

A system has also been known, which has an indication function for indicating an irregularity state in a pulse unit that is arranged separately from the scale unit. The pulse unit for use in this system converts analog signals supplied from an encoder, such as bi-phase pseudo-sinusoidal wave signals, into bi-phase rectangular wave signals with a required resolution at an interpolation circuit. The pulse unit outputs position pulse signals with A/B/Z phases to the controller through a driver corresponding to RS422. In addition, the pulse unit detects if any irregularities occur in the level of the encoder signal and the state of the interpolation circuit. When an irregularity occurs, the pulse unit varies its output for the controller to a high=impedance state and at the same time discriminates the irregular phenomenon to indicate it on a display.

The system using such the pulse unit is excellent in maintainability, however, it also has a disadvantage that the pulse unit prevents the space and cost from reducing because it must be arrange between the scale unit and the controller but is an separate unit from them. There is another system that contains the above-described function of the pulse unit inside a scale unit for the purpose of reducing the space and cost. In this case, the scale unit may often be mounted on a periphery of a movable element of the positioning device. Therefore, it is difficult to confirm an indicator by human eyes and thus such the indicator can not be employed. As a result, an irregular state can not be identified and a rapid procedure at the time of maintenance can be hardly achieved.

SUMMARY OF THE INVENTION

The present invention has been made in consideration of such the disadvantages and accordingly has an object to provide a position detector with an irregularity detectable function and cable for use in the detector. The position detector can achieve a rapid procedure at the time of maintenance along with sustaining the reduction of space and cost.

The present invention is provided with a position detector, which comprises a scale unit including a stationary element and a movable element. The scale unit generates position pulses in accordance with a relative displacement between the stationary element and the movable element. The scale unit outputs the position pulses via a first cable having a first connector at an end position thereof. The position detector also comprises a controller for position detecting. The controller receives the position pulses from the scale unit via the first cable. The controller calculates a relative position of the movable element to the stationary element based on the received position pulses. The scale unit generates an alarm signal to notify an error associated with generating the position pulses when the error occurs. The first cable transfers the alarm signal to the first connector. The first connector contains an irregularity informing means for performing an irregularity informing operation in response to the alarm signal output from the scale unit.

The present invention is also provided with a scale unit, which comprises a stationary element, a movable element, and a first cable having a first connector at an end portion thereof. The scale unit generates position pulses in accordance with a relative displacement between the stationary element and the movable element. The scale unit outputs the position pulses via the first cable. The scale unit generates an alarm signal to notify an error associated with generating the position pulses when the error occurs. The scale unit transfers the alarm signal to the first connector. The first connector contains an irregularity informing means for performing an irregularity informing operation in response to the alarm signal output from the scale unit.

The present invention is further provided with a cable for use in a position detector. The cable has a connector section at an end portion thereof. The cable transfers, to another equipment, position pulses generated at a scale unit in accordance with a relative displacement between a stationary element and a movable element. The cable comprises an alarm signal wire for transferring an alarm signal output from the scale unit to notify an error when the error occurs associated with generating the position pulses at the scale unit. It also comprises an irregularity informing means contained in the connector section for performing an irregularity informing operation in response to the alarm signal transferred via the alarm signal wire.

In the present invention, the scale unit has a function for generating an alarm signal to notify an irregularity associated with generating the position pulses when the irregularity occurs. The alarm signal is conducted to the first connector thorough the first cable elongated from the scale unit to operate the irregularity informing means contained within the first connector. Therefore, when the controller detects the irregularity, it is possible based on a situation of the irregularity informing means to identify which one has occurred between an error due to position pulse generation within the scale unit and an error due to a break or poor connection in the cable. In addition, the irregularity informing means can be dispose at an optimal location to be confirmed easily by human eyes because it is accommodated inside the first connector at the end portion of the first cable. Further, the present invention does not employ an additional separate unit such as the pulse unit, possible reducing the space and cost.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Preferred embodiments of the present invention will be described below with reference to the drawings.

Figure 1:
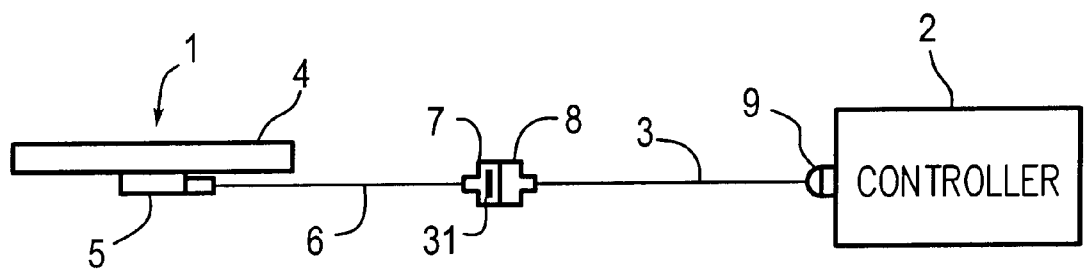
FIG. 1 is a diagram illustrating an arrangement of a position detector according to an embodiment of the present invention.

FIG. 1 is a diagram illustrating an arrangement of a position detector according to an embodiment of the present invention. The position detector comprises a linear scale that can be applied to semiconductor manufacturing equipment, electron microscopes, various machine tools, electronic component assemblers, disk drives and so forth. The linear scale comprises a scale unit 1, a controller 2 and an extension cable (second cable) 3 for connecting the scale unit with the controller.

The scale unit 1 includes a linear encoder body (stationary element) 4, a head section (movable element) 5 capable of sliding linearly along the linear encoder body 4, and a signal cable 6 (first cable) elongated from the head section 5. Arranged at the top portion of the signal cable 6 is a connector 7 (first connector), which is coupled to another connector 8 (second connector) provided at an end portion of the extension cable 3. The other end portion of the extension cable 3 is connected to the controller 2 via different connector 9.

Figure 2:
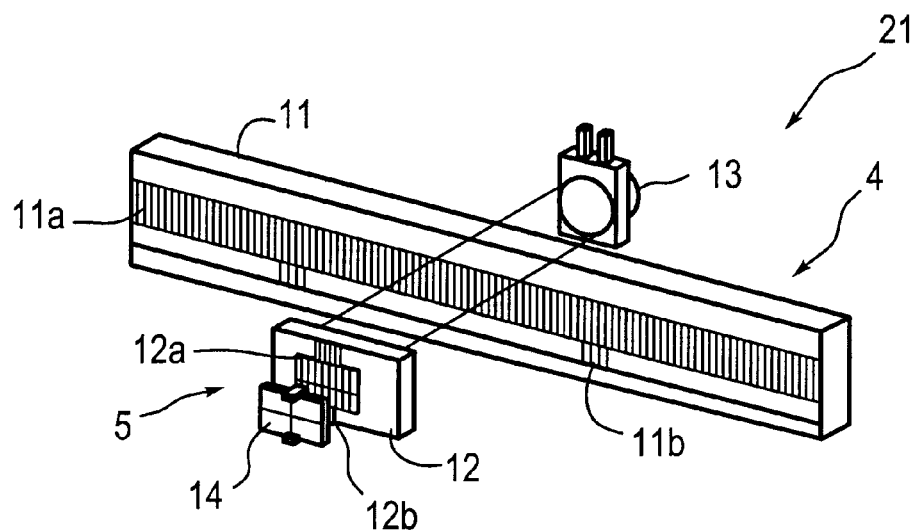
FIG. 2 is a squint view illustrating an arrangement of an encoder section in the detector.

The scale unit 1 is configured in such a manner as shown in FIG. 2, for example. The linear encoder body 4 includes a main scale 11 having a glass substrate on which constant scale patterns 11a and origin detection patterns 11b are formed with vaporized metal. The head section 5 contains an index scale 12, a light source (LED) 13 and a photodetector (phototransistor) 14. The index scale 12 is arranged freely movable opposing to the main scale 11. Notched on the index scale 11 are patterns 12a and 12b that correspond to the patterns 11a and 11b on the main scale 11. The light source 13 is disposed opposing to the index scale 12 through the main scale 11. The photodetector 14 receives lights emitted from the light source 13 and passing through the scales 11 and 12. These scales 11 and 12, light source 13 and photodetector 14 compose an encoder 21.

Figure 3:
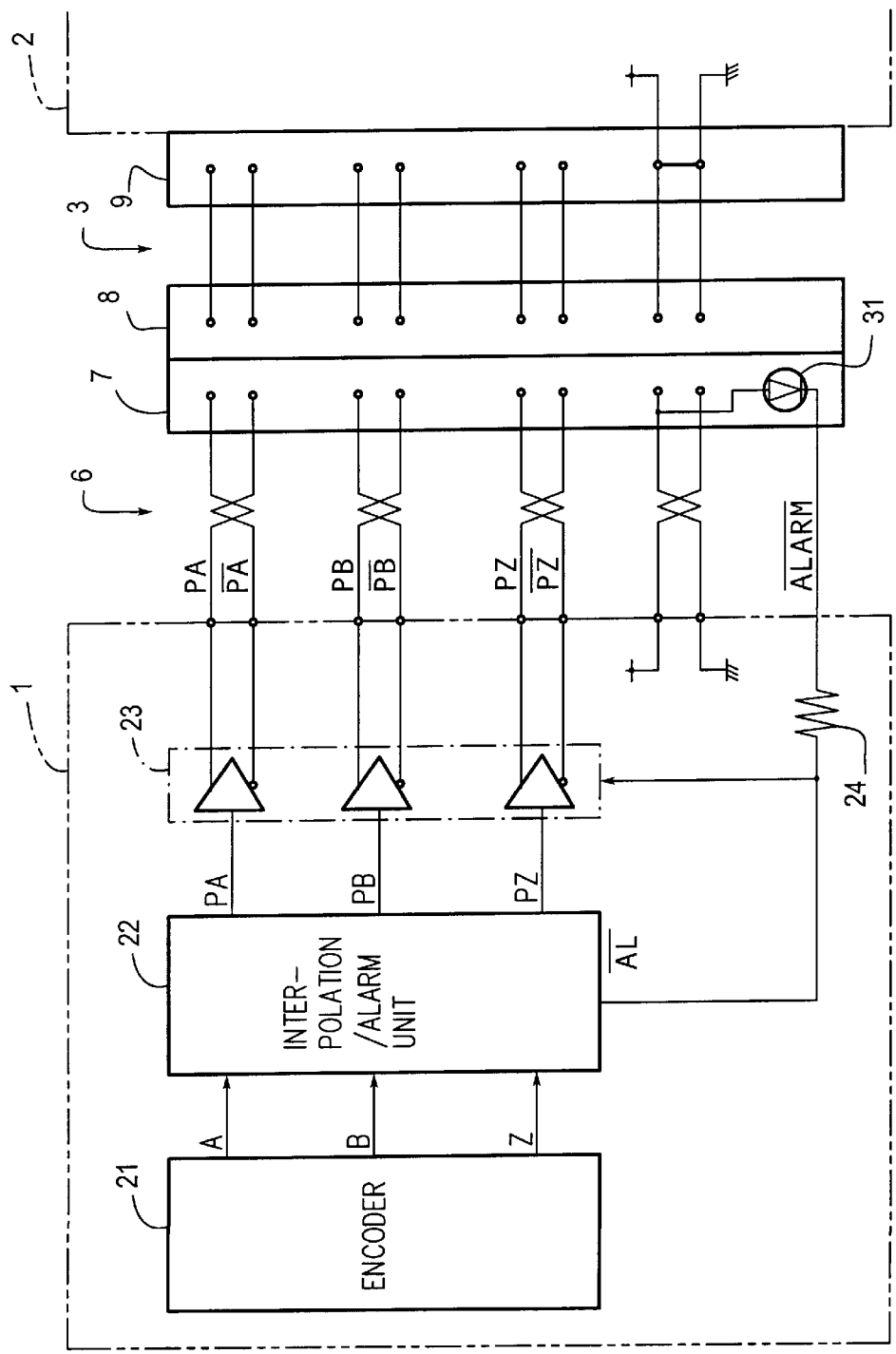
FIG. 3 is a block diagram showing an electrical configuration of the detector.

FIG. 3 is a block diagram showing an electrical configuration of the detector.

The scale unit 1 further comprises an interpolation/alarm unit 22 and a driver 23 other than the encoder 21 consisting of the scales 11 and 12, light source 13 and photodetector 14 described above. The encoder 21 outputs bi-phase pseudo-sinusoidal wave signals A and B and an origin detection signal Z which are supplied to the interpolation/alarm unit 22. The interpolation/alarm unit 22 interpolates the bi-phase pseudo-sinusoidal wave signals A and B to generate bi-phase rectangular wave signals PA and PB with a required resolution. It also generates an origin detection pulse PZ from the origin detection signal Z. The interpolation/alarm unit 22 further has a function to detect scale errors such as an interpolation error due to an over-speed and outputs an alarm signal AL when an error occurs. The pulses PA, PB and PZ from the interpolation/alarm unit 22 are output as plus and minus pulse signals PA, PA, PB, PB, PZ and PZ through a driver 23 corresponding to RS422. The driver 23 is a tri-state buffer and becomes a high-impedance state in response to the alarm signal AL. The alarm signal AL is output to the outside as an alarm signal ALAM through a resistor 24.

The signal cable 6 in this example consists of 9 wires of which six are assigned for outputting the pulse signals, PA, PA, PB, PB, PZ and PZ, two are employed to supply a power voltage and ground voltage from the controller 2, and one is assigned for transmitting the alarm signal ALAM. The connector 7 contains an alarm indicator 31 consisting of an LED as an irregularity informing means. The alarm indicator 31 is connected between a supply line and an alarm line so that it can be easily seen from the outside as shown in FIG. 1. According to the above arrangement, when the interpolation/alarm unit 22 detects an error and activates the alarm ALAM (to the low level), a current flows into the alarm indicator 31 and indicate an error state.

A method of determining a failure in the position detector thus configured will be described next.

Figure 4:
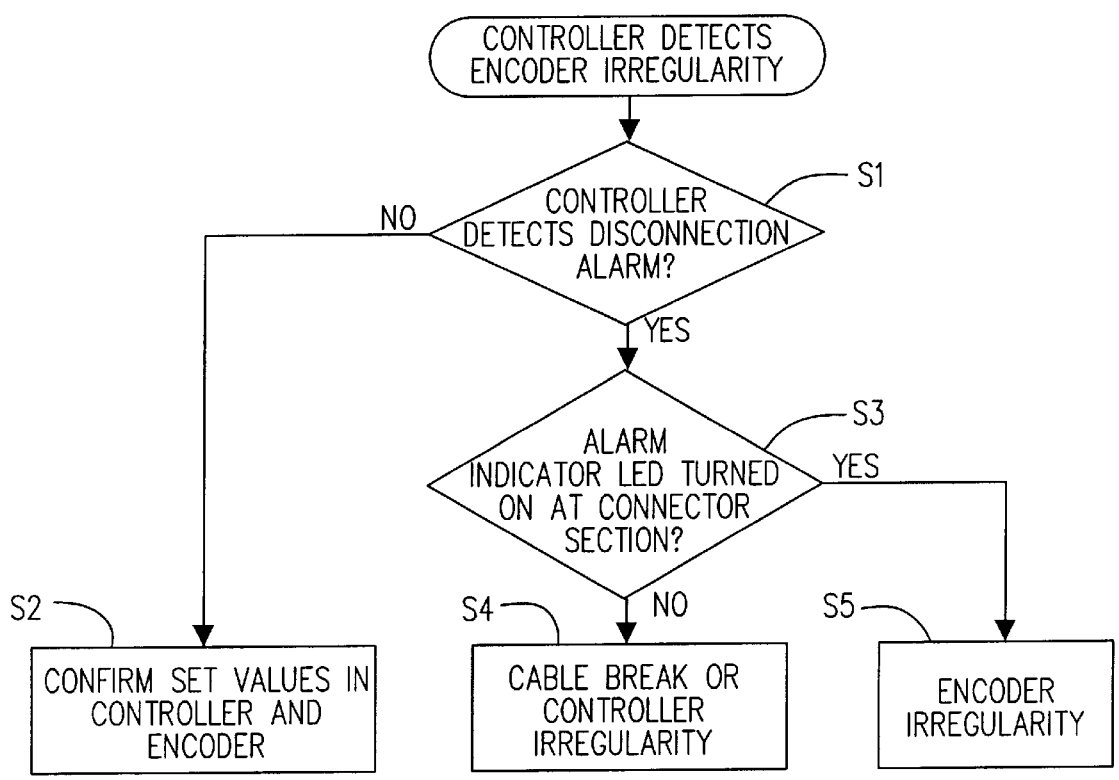
FIG. 4 is a flowchart showing a procedure for determining a failure in the detector.

FIG. 4 is a flowchart showing such the failure determining method.

When the controller 2 detects an irregularity of the encoder 21 from a deviation between the position instruction and the position feedback from the scale unit 1, the controller 2 checks if the disconnection alarm is output. More definitely, checking if the input terminal connected to the connector 9 is in a high-impedance state (S1). If the input terminal is not in the high-impedance state, it can be considered that there is no irregularity in the signal path from the scale unit 1 to the connector 9 and in the output of the encoder. Then, confirming set values (such as a sliding speed) in the controller 2 and encoder 21 (S2), and if required, resetting them to appropriate values. If the input terminal is in the high-impedance state, then checking if the alarm indicator 31 of the connector 7 is turned on (S3). If the alarm indicator 31 is not turned on, it is determined that there may be a break or poor connection in the cable 3 or 6 or an irregularity in the controller 2 (S4). If the alarm indicator 31 is turned on, it is determined that there is an irregularity in the encoder 21 (S5).

In the position detector, the connector 7 includes the alarm indicator 31 therein. Thus, when a failure occurs, it can be easily identified from the alarm indicator 31 whether the failure is one in the encoder 21 or a cable break or controller failure. In addition, the alarm indicator 31 is arranged in the connector 7 at the top portion of the signal cable 6 of the scale unit 1. Therefore, it can be located at an easily visible position, easing maintenance. Although the alarm indicator 31 may also be provided in the connector 8 or 9 of the extension cable 3, the top portion of the signal cable belonging to the scale unit 1 is most preferable to locate it because users may often prepare the extension cable 3 itself.

As described above, according to the present invention, when the controller detects an irregularity, it is possible based on a situation of the irregularity informing means to identify which one has occurred between an error due to position pulse generation within the scale unit and an error due to a break or poor connection in the cable. In addition, the irregularity informing means can be disposed at an optimal location to be confirmed by human eyes with ease because it is accommodated inside the first connector at the end portion of the first cable. Further, the present invention does not employ an additional separate unit such as a pulse unit, possibly reducing the space and cost.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A position detector, comprising:

a scale unit including a stationary element and a movable element, said scale unit generating position pulses in accordance with a relative displacement between said stationary element and said movable element, said scale unit outputting said position pulses via a first cable having a first connector at an end portion thereof; and a controller for position detecting, said controller receiving said position pulses from said scale unit via said first cable, said controller calculating a relative position of said movable element to said stationary element based on said received position pulses, wherein said scale unit generates an alarm signal to notify an error associated with generating said position pulses when said error occurs, said first cable transfers said alarm signal to said first connector, and said first connector contains an irregularity informing means for performing an irregularity informing operation in response to said alarm signal output from said scale unit.

2. The position detector according to claim 1, further comprising a second cable for transferring said position pulses, said second cable having a second connector at an end portion thereof to be connected to said first connector, wherein said controller is connected to another end portion of said second cable for receiving said position pulses from said scale unit via said first and second cables.

3. The position detector according to claim 1, wherein said first connector includes an LED with alarm indicating function as said irregularity informing means.

4. A scale unit, comprising:

a stationary element;

a movable element; and a first cable having a first connector at an end portion thereof, said scale unit generating position pulses in accordance with a relative displacement between said stationary element and said movable element, said scale unit outputting said position pulses via said first cable, wherein said scale unit generates an alarm signal to notify an error associated with generating said position pulses when said error occurs, said scale unit transfers said alarm signal to said first connector, and said first connector contains an irregularity informing means for performing an irregularity informing operation in response to said alarm signal output from said scale unit.

5. The scale unit according to claim 4, wherein said first connector includes an LED with alarm indicating function as said irregularity informing means.

6. A cable for use in a position detector, having a connector section at an end portion thereof, for transferring position pulses to another equipment, said position pulses generated at a scale unit in accordance with a relative displacement between a stationary element and a movable element, said cable comprising:

an alarm signal wire for transferring an alarm signal output from said scale unit to notify an error when said error occurs associated with generating said position pulses at said scale unit; and an irregularity informing means contained in said connector section for performing an irregularity informing operation in response to said alarm signal transferred via said alarm signal wire.

7. The cable for use in a position detector according to claim 6, wherein said irregularity informing means includes an LED with alarm indication function.

* * * * *